United States Patent Office 2,992,222
Patented July 11, 1961

2,992,222
TETRAHYDROFURFURYLPIPERAZINES
Armiger H. Sommers, Lake Forest, Ill., assignor to Abbott Laboratories, North Chicago, Ill., a corporation of Illinois
No Drawing. Filed Feb. 26, 1959, Ser. No. 795,611
3 Claims. (Cl. 260—268)

This invention relates to new and novel compounds corresponding to the formula

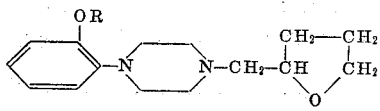

In this and succeeding formulas, R represents lower alkyl containing from 1 to 4 carbon atoms, inclusive. The therapeutically acceptable, non-toxic, acid-addition salts of the bases included in the above formula are also contemplated to be encompassed within the scope of the present invention and are to be considered as equivalents thereof. Appropriate acid-addition salts are those derived from mineral acids such as hydrochloric acid, hydrobromic acid, hydriodic acid, phosphoric acid and sulfuric acid, as well as organic acids such as acetic, citric, tartaric, benzoic, salicylic, glycolic, succinic, nicotinic, ascorbic, maleic, malic, or lactic acids, and the like.

The bases as well as the acid-addition salts of said bases are valuable therapeutic agents, and more particularly, they are extremely useful as hypotensive agents in animals. The compounds also reduce excitement of the animal by relaxing the skeletal muscles to produce a tranquilizing action. When a 25 mg. dose of 1-(ortho-methoxyphenyl) - 4 - tetrahydrofurfurylpiperazine is administered to a cat via the intravenous route, there is an immediate marked drop in blood pressure.

The new and novel compounds of this invention may be prepared by the reaction of tetrahydrofurfurylamine with a compound of the formula

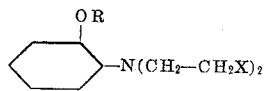

wherein X represents a halogen, preferably chlorine. The reaction is carried out in the presence of an inert organic solvent, such as ethanol, and takes place smoothly from room temperature to the reflux temperature of the reaction mixture with the formation of the desired product and hydrohalide of reaction. Good results are obtained when employing substantially 3 molecular proportions of the amine per mole of N.N-bis-(beta-haloethyl)-ortho-alkoxyaniline. Upon completion of the reaction, the desired product may be isolated by conventional methods.

The acid-addition salts of the above base products can be readily prepared by methods well known to those skilled in the chemical art. Thus, the base dissolved in a lower alkanol, preferably isopropyl alcohol, is added to the appropriate acid dissolved in the same solvent in suitable molar amounts. The reaction mixture is then cooled and the salt which precipitates is removed by filtration and dried.

The following examples illustrate the invention but are not to be construed as a limitation thereof:

EXAMPLE I 1-(ortho-methoxyphenyl)-4-tetrahydrofurfurylpiperazine

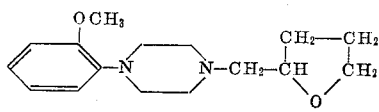

A solution of 16 grams (0.15 mole) of tetrahydrofurfurylamine and 13 grams (0.05 mole) of N,N-bis-(beta-chloroethyl)-ortho-anisidine in 75 ml. of ethanol is heated at the boiling temperature and under reflux for 14 hours. The reaction mixture is then concentrated and the residue washed with 150 ml. of water. The aqueous mixture is extracted twice with 100 ml. portions of benzene and the combined benzene extracts are thereafter fractionally distilled under reduced pressure to obtain the desired 1 - (ortho-methoxyphenyl) - 4 - tetrahydrofurfurylpiperazine as a colorless oil boiling at 146° C. at 0.1 mm. pressure and having a refractive index n/D of 1.5521 at 25° C. Analysis.—Calc'd. for $C_{16}H_{24}N_2O_2$: C=69.5%; H=8.8%; N=10.1%. Found: C=69.4%; H=8.7%; N=10.2%.

The hydrochloride salt of the base prepared above is obtained by dissolving one equivalent of said base in isopropyl alcohol and ether and treating the resulting solution with one equivalent of anhydrous hydrogen chloride. The hydrochloride salt which precipitates upon cooling the reaction mixture is separated by filtration and is found to melt at 189°–191° C. Analysis.—Calc'd. for $C_{16}H_{25}ClN_2O_2$: C=61.4%; H=8.1%; N=9.0%. Found C=61.2%; H=8.1%; N=8.8%.

The free base can be readily converted to other salts such as the hydrobromde, hydroiodide, sulfate, phosphate, acetate, benzoate, salicylate, glycolate, succinate, nicotinate, ascorbate, tartrate, maleate, malate, lactate, and the like by neutralization with the appropriate acid.

EXAMPLE II 1-(ortho-butoxyphenyl)-4-tetrahydrofurfurylpiperazine

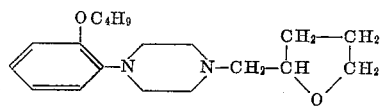

A solution of 32.0 grams (0.3 mole) of tetrahydrofurfurylamine and 29.0 grams (0.1 mole) of N,N-bis-(beta-chloroethyl)-ortho-butoxyaniline in 200 ml. of methanol is heated at the boiling temperature and under reflux for 48 hours to complete the reaction. Upon completion of the reaction, the reaction mixture is processed as described in Example 1 to obtain the desired product. 1 - (ortho-butoxyphenyl)-4-tetrahydrofurfurylpiperazine has a molecular weight of 319.

On neutralization of the free base thus prepared with the appropriate acid, the hydrochloride, hydrobromide, hydroiodide, sulfate, phosphate, acetate, benzoate, salicylate, glycolate, succinate, nicotinate, ascorbate, tartrate, maleate, lactate and the like ar readily obtained.

In a manner similar to that described in Example I, the following compounds as well as their acid-addition salts can be prepared:

1 - (ortho - ethoxyphenyl) - 4 - tetrahydrofurfurylpiperazine by the reaction of N,N-bis-(beta-chloroethyl)-ortho-propoxyaniline and tetrahydrofurfurylamine.

1 - (ortho - propoxyphenyl) - 4 - tetrahydrofurfurylpiperazine by the reaction of N,N-bis-(beta-bromoethyl)-ortho-propoxyaniline and tetrahydrofurfurylamine.

Neutralization of any of the above free bases with the appropriate acid results in the formation of the corresponding hydrochloride, hydrobromide, hydroiodide, sulfate, phosphate, acetate, benzoate, salicylate, glycolate, succinate, nicotinate, ascorbate, tartrate, maleate or lactate.

The N,N-bis-(beta-haloethyl)-ortho-alkoxyanilines employed as starting materials in the present invention may be prepared by heating one molecular proportion of an ortho-alkoxyaniline with two molecular proportions of ethylene oxide at a temperature of from 75° to 150° C. in a confined space, preferably a stainless steel bomb. The resulting N,N - bis- (beta - hydroxyethyl) - ortho - alkoxyaniline intermediate is thereafter separated by fractional distillation of the reaction mixture. Further treatment of this intermediate with a phosphorus oxyhalide, preferably POCl₃, on a steam bath will produce the desired product which is isolated by adding water to the reaction mixture, extracting said mixture with benzene and fractionally distilling the benzene extract. N,N-bis-(beta-hydroxyethyl)-ortho-anisidine is a very viscous oil boiling at 145°–147° C. at 0.3 mm. pressure whereas N,N-bis-(beta-chloroethyl)-ortho-anisidine is a mobile liquid boiling at 146°–150° C. at 1.0 mm. pressure. Also, N,N-bis-(beta-hydroxyethyl)-ortho-ethoxyaniline is a colorless oil boiling at 170°–175° C. at 1.0 mm. pressure while N,N-bis-(beta-chloroethyl)-ortho-ethoxyaniline is a colorless liquid boiling at 141° C. at 0.4 mm. pressure.

I claim:
1. Tetrahydrofurfurylpiperazines selected from the group consisting of (*a*) compounds corresponding to the formula

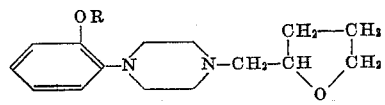

wherein R represents lower alkyl, and (*b*) pharmacologically acceptable non-toxic acid-addition salts thereof.
2. 1 - (ortho - methoxyphenyl) - 4 - tetrahydrofurfurylpiperazine.
3. The hydrochloride salt of 1-(ortho-methoxyphenyl)-4-tetrahydrofurfurylpiperazine.

References Cited in the file of this patent

Cerkovnikov et al.: Archiv. Zu Keniju, pp. 28–29 (1946).

Richter's Organic Chemistry, volume IV, page 4 (1947).

UNITED STATES PATENT OFFICE
CERTIFICATE OF CORRECTION

Patent No. 2,992,222                 July 11, 1961

Armiger H. Sommers

It is hereby certified that error appears in the above numbered patent requiring correction and that the said Letters Patent should read as corrected below.

Column 2, line 26, for "hydrobromde" read -- hydrobromide --; line 52, for "ar" read -- are --; same column 2, line 58, for "propoxyaniline" read -- ethoxyaniline --.

Signed and sealed this 19th day of December 1961.

(SEAL)
Attest:

ERNEST W. SWIDER
Attesting Officer

DAVID L. LADD
Commissioner of Patents

USCOMM-DC